UNITED STATES PATENT OFFICE 2,289,030

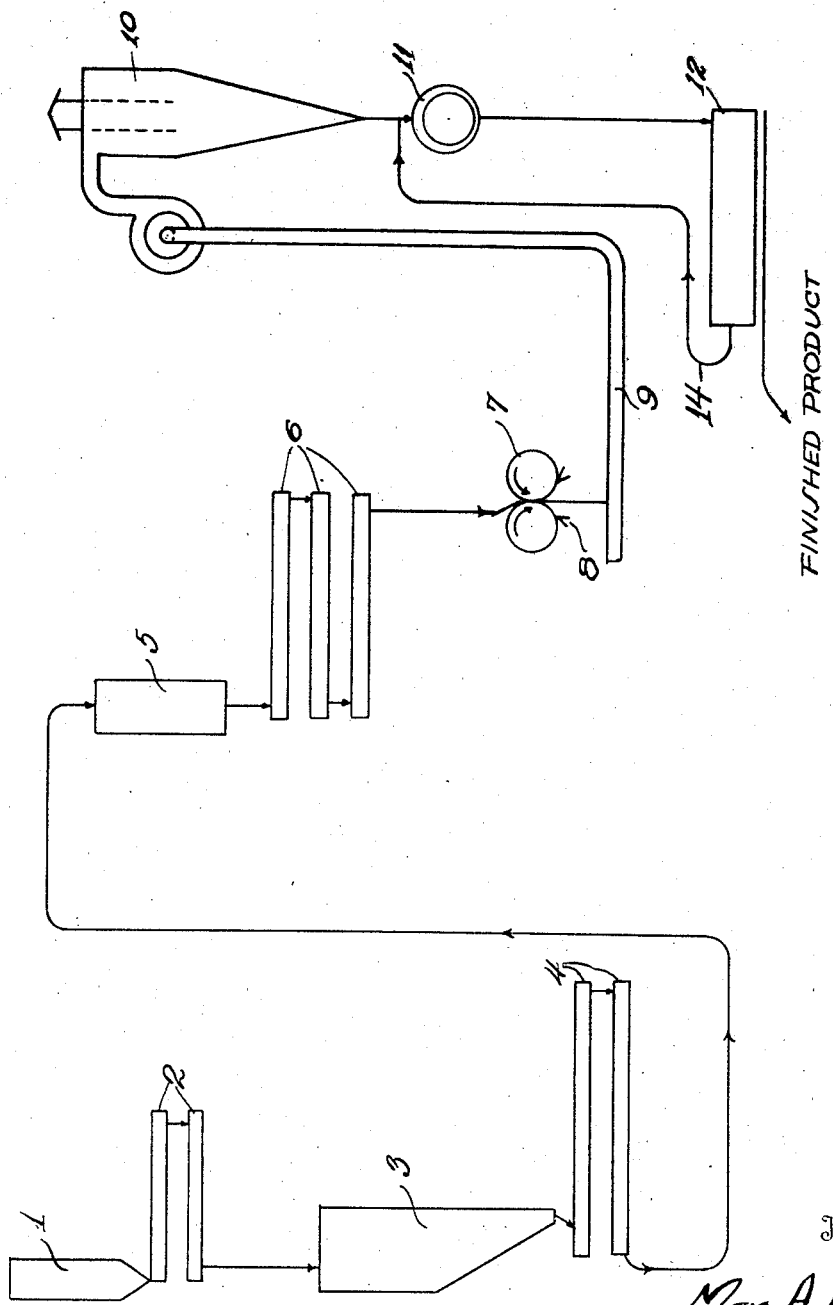

FOUNDRY FLOUR AND PROCESS OF MANUFACTURING THE SAME

Max A. Miller, Omaha, Nebr., assignor to Miller Cereal Mills, Incorporated, Omaha, Nebr., a corporation of Nebraska Application December 21, 1939, Serial No. 310,456

8 Claims. (Cl. 22—188)

This invention relates to a grain product for industrial use and to the process of manufacturing the same.

In the manufacture by known processes of specialty flours, particularly foundry flour for use as a core binder and in the making of core box molds, from grain, and particularly from corn, it is the recognized practice to degerminate the whole corn and to employ only the degerminated portion thereof in the form of grits, meal flake, or flour, as the base material for the subsequent processing steps entailed in the production of the specialty flour as aforesaid. As is well known the operation of degermination and the use of the degerminated portions only of the grain require not only the separation of the germ stock but also the separation of the bran from the grits, and thus represents an expensive operation in the process, which is of course reflected in the cost of the final product. More important, and not previously recognized, is the fact that degermination removes a valuable source of oil in the finished product (corn oil in the case of foundry corn flour), with the result that the known types of foundry flour are very low in oil content and require the addition of expensive drying oils in use.

The present invention contemplates and aims to provide an improved process for the production of specialty flours, such as a foundry flour, from whole grain such as corn without degermination thereof, thus not only to simplify the process by doing away with the expensive corn mill operations of degerminating and dehulling but also to eliminate all by-products in the nature of small grits, flour, meal, feed, oil, germ stock, and other items of similar classification. By the process of the present invention these by-products are incorporated into the finished product and add to the quality and value thereof.

More specifically, the invention contemplates and provides an improved foundry corn flour product and a process for the production thereof in which non-degerminated whole corn as distinguished from grits, is so processed as to result in greater gelatinization of the starch granules than is obtainable in the prior practices, due to the ability to temper whole corn for a longer period and at higher temperatures as the result of the hull protection. According to the present process the hull acts as a protective sack retaining the moisture, regardless of the amount of moisture added, until conversion takes place. Thus, the starch granules are more highly ruptured than under the old process. Further, the retention of the hull prevents the formation of a gummy substance on the material during tempering whereby the grain may be more easily handled during the subsequent handling and processing stages. Due to the greater gelatinization obtained and the protection afforded the kernels by the hulls, the original shape of the grain is maintained up to the point of conversion, thus to provide a highly gelatinized kernel easy to handle in the process.

The invention also aims to provide an improved foundry corn flour which possesses greater water absorption properties, greater adhesive power, and one that is more easily controlled for higher or lower densities than products resulting from the known processes. The processing of the whole grain as distinguished from the processing of grits further provides a finished product containing a high content of corn oil, which is a semi-drying oil, valued in many adhesive formulae. When the product is used as a core binder and in the making of core box molds, the oil content thereof takes the place of the addition drying oil usually added in core manufacture and also provides additional smoothness and workability in making up cores in addition to giving increased strength in the finished core.

Other objects will be in part obvious and in part hereinafter pointed out in connection with the following analysis of this invention wherein is illustrated an embodiment of the invention in detail.

Referring to the drawing which is in the nature of a flow sheet representing in schematic manner the various steps of the improved process and their relation to one another, reference character 1 designates a batch bin for the raw material which is more particularly referred to in the following as whole corn, although other grains such as wheat, rice and barley may be processed to the final product in accordance with the present invention. It will be understood, further, that the raw material (whole corn) to be processed is especially selected to insure uniform, well cleaned, and sound kernel.

The whole corn is first moistened with water, either cold or warm, in a suitable moistening device 2 and the moistened batch then transferred to the first tempering tank 3 where it is allowed to stand for a period of time ranging from one to four hours, depending on the condition of the corn initially, the temperature of the water added, and the size of the batch tempering together. When the moisture has soaked well into the corn kernels, the batch is transported to a steamer 4 in which steam and/or water is added, at a relatively higher temperature of from 150° F. to 210° F. The amount of moisture added and its temperature depend on the conditions mentioned above, such as the initial corn condition and the size of the batch.

Following the addition of moisture at the relatively higher temperature the batch is transported to a second tempering tank 5 where it is allowed to stand for the substantial period of from one to four hours.

Preferably the moistened warm whole corn with hulls intact is transferred to a steam-jacketed cooker 6 wherein it is agitated and heated to a temperature of 250° F. to 450° F., depending upon the amount of rupture of starch granules desired. This heating operation may be carried on from two minutes to about one hour, and under certain conditions, depending on the qualities desired in the finished product, may be omitted altogether.

Following tempering, and heating, if the heating step is included, the batch is next run between flaking rolls 7 heated to high temperature and operating under high pressure, this operation being one in which the starch molecules are ruptured under the effect of heat and pressure and the whole corn converted to flake formation. Partial gelatinization of the starch to a high degree having been earlier effected, the cellular structure of the material is destroyed, and the proteid matter is rendered available upon the conversion aforesaid.

The flakes are scraped from the rolls 7 by carefully adjusted knives 8 and dropped to an airlift conduit 9 wherein the flakes are dried and cooled by an air current in their passage to a bin 10 disposed generally above rolls, pulverizers, or other grinding equipment employed, as indicated at 11. In passing through the grinding equipment 11 the flakes are brought to desired fineness, this fineness being controlled by the use of a grader 12. If desired, the coarser material retained in the grader 12 may be subjected to one or more passes through the grinder 11, a re-pass line 14 being provided for this purpose.

The final product coming from the grader 12 is in the nature of an improved foundry flour. By reason of the tempering for relatively long periods and at relatively high temperature as permitted by the protection afforded the corn kernels by the retained hulls thereof, the shape of the corn is retained during the handling and processing up to the stage of conversion, regardless of the amount of moisture added in the tempering stages. Further, the retention of the hull prevents the formation of a gummy substance during the tempering stage and this of course adds to the ease and ability to handle the material during subsequent stages. With the hull functioning to retain the moisture until conversion takes place, the starch granules thereof are more highly ruptured, with the result that the final product possesses greater water absorption properties, greater adhesive power, and is more easily controlled for higher and lower densities than the products of the prior practices.

The processing of the whole grain also results in the finished product containing a relatively high content of corn oil, as distinguished from the product resulting from the processing of grits, meal or flour. In the latter case only approximately one-half of one per cent of oil is included in the finished product whereas the product of the present invention provides four to five per cent of oil in the case of corn, and various other percentages for other grains. Accordingly, it will be seen that approximately ten times the amount of corn oil is contained in the product of the present invention than in the conventional product produced by the old practices. This high content of oil in the final product is an advantage when the product is used as a binder in the manufacture of foundry cores and core box molds because appreciably less drying oil need be added thereto than to foundry flour made by the known processes as usually employed in core manufacture, while providing a product having enhanced smoothness and workability in making up cores in addition to giving strength to the finished core.

As many changes could be made in carrying out the above process without departing from the scope of the invention, it is intended that all matter contained in the above description or shown in the accompanying drawing shall be interpreted as illustrative and not in a limiting sense.

I claim:

1. The herein described process for the production of a foundry flour, which consists in the steps of gelatinizing non-degerminated whole grain within the hull, flaking the gelatinized whole grain thereby to rupture the starch granules thereof, and reducing the flaked material to a flour.

2. The herein described process for the production of a foundry flour, which consists in the steps of tempering non-degerminated whole grain within the hull for a period of time sufficient to effect a relatively high degree of gelatinization thereof, flaking the gelatinized grain thereby to destroy the cellular structure thereof, and reducing the flaked material to a flour.

3. The herein described process for the production of a foundry flour, which consists in the steps of tempering non-degerminated whole grain within the hull in a plurality of tempering stages for periods of time and at temperatures sufficient to effect a relatively high degree of gelatinization thereof, flaking the gelatinized grain thereby to destroy the cellular structure thereof, and reducing the flaked material to a flour.

4. The herein described process for the production of a foundry flour, which consists in the steps of tempering non-degerminated whole grain within the hull in two stages and for periods of time and at temperatures sufficient to effect a relatively high degree of gelatinization thereof, of which the second tempering stage is carried on at a temperature which is substantially elevated with reference to the temperature of the first stage, flaking the gelatinized grain thereby to destroy the cellular structure thereof, and reducing the flaked material to a flour.

5. A gelatinized whole grain foundry flour having its starch content in readily available and finely divided form and containing the germ, grit and hull portions of the whole grain.

6. A gelatinized whole grain foundry flour having its starch content in readily available and finely divided form and containing the germ with its germ oil content and the hull portions of the whole grain.

7. A gelatinized foundry corn flour made from whole corn having its starch content in readily available and finely divided form and containing the germ, grit and hull portions of the whole corn.

8. A gelatinized foundry corn flour made from whole corn having its starch content in readily available and finely divided form and containing the germ with its germ oil content and the hull portions of the whole corn.

MAX A. MILLER.